United States Patent
Fahn (10) Patent No.: US 8,125,347 B2
(45) Date of Patent: Feb. 28, 2012

(54) TEXT ENTRY SYSTEM WITH DEPRESSABLE KEYBOARD ON A DYNAMIC DISPLAY

(75) Inventor: Paul Fahn, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 419 days.

(21) Appl. No.: 12/421,358

(22) Filed: Apr. 9, 2009

(65) Prior Publication Data

US 2010/0259368 A1   Oct. 14, 2010

(51) Int. Cl.
 *G08B 5/00* (2006.01)
(52) U.S. Cl. .......... 340/815.4; 340/384.1; 340/540; 340/665; 340/407.1; 340/407.2; 340/5.4; 345/173; 345/174; 345/178; 345/205
(58) Field of Classification Search ........... 340/815.4, 340/815.48, 540, 665, 407.1, 407.2, 5.4; 345/173.174, 178, 205
See application file for complete search history.

(56) References Cited

U.S. PATENT DOCUMENTS

| 2005/0057528 A1* | 3/2005 | Kleen | ............ 345/173 |
| 2008/0180399 A1 | 7/2008 | Cheng | |
| 2008/0284925 A1* | 11/2008 | Han | ............ 349/12 |

FOREIGN PATENT DOCUMENTS

WO  WO2007/012899  2/2007

* cited by examiner

*Primary Examiner* — Tai T Nguyen
(74) *Attorney, Agent, or Firm* — Beyer Law Group LLP

(57) ABSTRACT

A display component implements a text entry system for a device, such as a cell phone or other handheld device, has various layers that mimic characteristics of a conventional keyboard. A keyboard is displayed on a dynamic touch screen display. When a key is pressed by a user, the surface area of the key on the display depresses, thereby mimicking a conventional keyboard that would typically be used with a desktop or laptop computer. The display component is comprised of various layers or panels. One layer is a compressible touch sensitive or touch screen layer. Adjacent to this layer is a compressible display layer. Another layer is a deformable or cushion layer for supporting a specific weight, such as the weight of user fingers or hands. Adjacent to the deformable layer is a lower touch sensitive layer which has a coordinate system. A user pressing down on a key on the compressible display component at a specific spot creates a downward deformation at that specific spot, thereby providing a more ergonomic feel to the user when entering text into the device.

13 Claims, 6 Drawing Sheets

TEXT ENTRY SYSTEM WITH DEPRESSABLE KEYBOARD ON A DYNAMIC DISPLAY

BACKGROUND OF THE INVENTION

1. Field of the Invention

The present invention relates generally to keyboards and displays for computing devices. More specifically, the invention relates to an ergonomic keyboard on a computing device that mimics a physical keyboard.

2. Description of the Related Art

Many small computing devices, especially handheld devices such as cell phones, presently have ergonomic and technical drawbacks with respect to text entry or text input. Mobile fold-up keyboards or keyboards that roll up, for example, have proven to be too cumbersome for many users or simply viewed as extra peripherals that have to be carried with the user and, as such, are inconvenient. Or they may be seen as too expensive. Some do not have a natural or user-friendly feel, such as not providing some type of feedback to the user, especially a depression of a key when pressed on. For example, a keyboard may be projected on a hard surface and have a conventional size, but typing on a flat, inflexible surface does not feel natural to many users. The rigidity of a table is not comfortable for most users for normal typing. Projected keyboards also require that the user keep fingers lifted above the surface, that is, ensure that there is no contact between the fingers and the surface. In another example, many handheld devices have dynamic touch screen displays where the display changes depending on the mode or function of the device. In text-entry mode, the display may show a keyboard. However, the keyboard is on a flat, inflexible surface that is rigid and provides no feedback to the user. These types of keyboards that are displayed on dynamic displays are also often uncomfortable for users to use for entering text or typing on.

Other keyboards that do not have these specific drawbacks (keys that do not depress, lack of user feedback, etc.) are often small or require that the keyboard slide out or be revealed by moving another part of the device or phone, thereby essentially changing the mechanical configuration of the device each time a user needs to enter text. Small keyboards on many handset devices are difficult for users to use accurately and efficiently. The keys may be too small or hard to read. They may also require character sharing (i.e., a single key may be used for two or more characters/symbols) which makes it difficult for users to type quickly and accurately. The keyboards often become too complex for many users and the intuitive feel of the conventional QWERTY keyboard is lost. Installing or incorporating a larger keyboard into a handheld device to avoid having to use some type of peripheral and to make it easier to type, quickly leads to manufacturing cost issues.

Thus, it would be desirable to have a keyboard on a dynamic display of a handheld or mobile device that provides feedback to the user in the form of a key depression when a key is pressed, as is nearly always the case with a conventional keyboard.

SUMMARY OF THE INVENTION

In one aspect of the invention, a device, such as a cell phone or mobile computing device, has a processor, a memory, and a display component. The display component is comprised of various layers or panels. One layer may be a compressible (i.e., flexible) touch sensitive layer, also referred to as a touch screen layer. Next to or near this layer may be a compressible (i.e., flexible) display layer. Another layer in the display component may also be a deformable or cushion layer for supporting a specific weight. Adjacent to or near the deformable layer may be a lower touch sensitive layer which has a coordinate system. A user pressing down on a key on the compressible display component at a specific spot creates a downward deformation at that spot. In one embodiment, the compressible touch sensitive layer may be the top layer of the display component and comes in direct contact with a user finger. In another embodiment, the compressible display layer may be the top layer. In one embodiment, the compressible touch sensitive layer may have multi-touch capabilities. In another embodiment, the lower touch sensitive layer may have multi-touch capabilities.

Another aspect of the invention is a method of processing text entry into a device having a display. The display may utilize an upper touch sensor layer and a lower touch sensor layer. A depression is detected on the display from a user finger pressing down on a key from a displayed keyboard. The depression may have a location value and a time value. A key signal in response to the depression may be created at the lower touch sensor layer. Utilizing the key signal, a keyboard symbol corresponding to the key pressed by the user may be determined. A decompression in a cushion layer indicating a release in user finger pressure is detected. In one embodiment, a compression in a flexible display layer may be detected. In another embodiment, a compression in a flexible touch sensitive layer may be detected.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Various embodiments of the present invention describe touch screen keyboards displayed on mobile devices that are able to mimic the feel of a conventional keyboard when used to enter text into a device. Embodiments of text-entry systems that may be implemented on dynamic displays are described in the figures. The touch screen or touch sensor keyboards described herein provide a user of a mobile device, such as a cell phone with a dynamic display, with a comfortable surface to type on. The user is able to feel a depression when pressing on a key. By virtue of using dynamic displays, a keyboard is only displayed when the device is in a "text entry" mode, thus saving resources when the user is not entering text. Keyboards on touch screen displays can use as much of the display area as necessary to provide a comfortable key size that the user can touch, limited only by the size of the display.

Text entry systems of the various embodiments, intended for use with but not limited to dynamic displays, are comprised of numerous layers. In a preferred embodiment, the text entry system implements two touch sensor layers. These two layers have a deformable layer disposed between them, the deformable layer, also referred to as a cushion layer, need not be necessarily adjacent to either of the touch sensor layers. However, of the two touch sensor layers, the upper touch sensor layer is adjacent to a display layer.

Figure 1A:
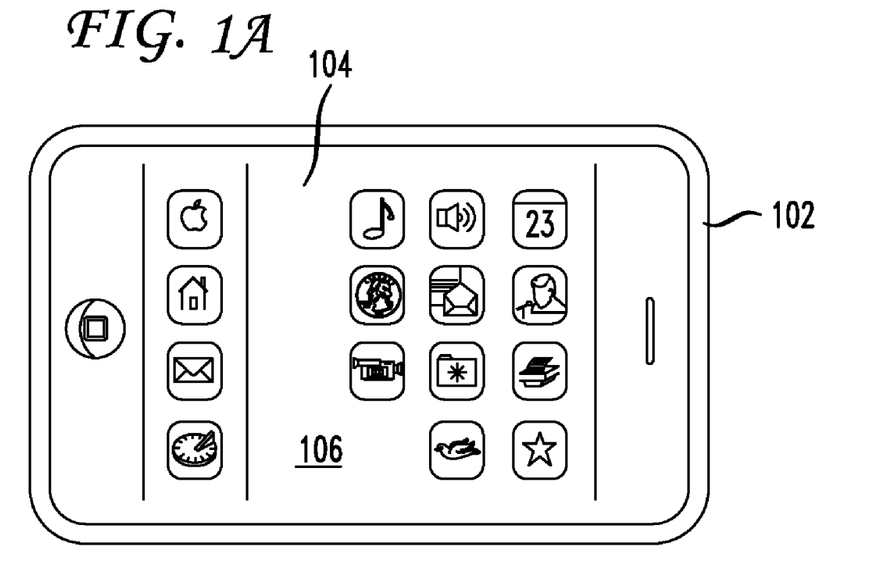
FIG. 1A shows a device having a dynamic display displaying a configuration of images and text (e.g., home screen)
Figure 1B:
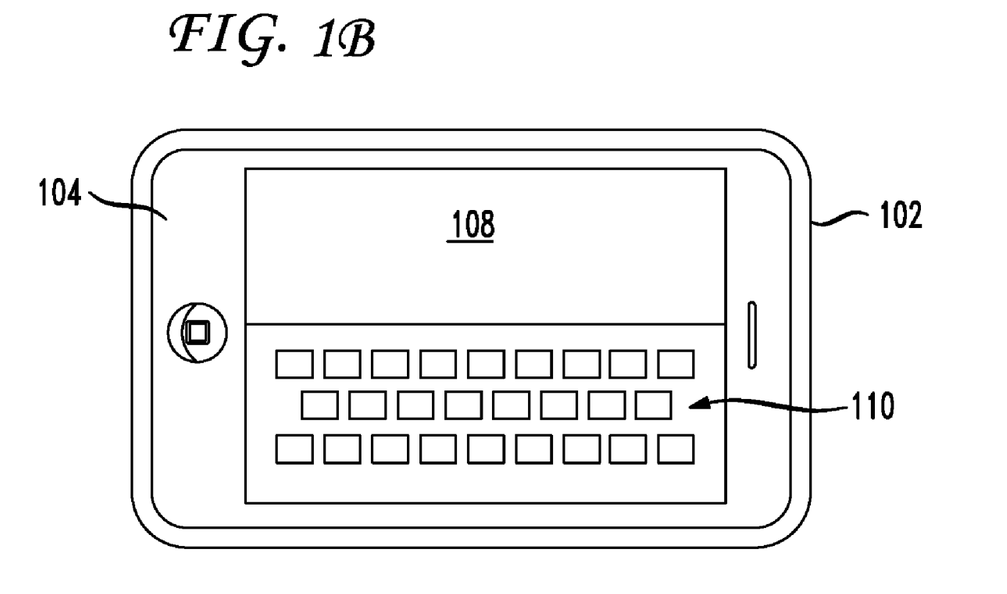
FIG. 1B shows a device having a dynamic display displaying a keyboard used when the device is in text-entry mode.

FIGS. 1A to 1B are illustrations a dynamic display on a device. The device may be any type of mobile device, such as a tablet computer, a cell phone, a media player, or other so-called smart handset computing device having a touch screen display. In FIG. 1A a device 102 has a dynamic display 104 showing a first configuration 106 of images and text, such as a home screen for a cell phone. This configuration may be any non-text-entry mode display. The user may touch a portion of dynamic display 104 and cause device 102 to transition into text-entry mode. In FIG. 1B dynamic display 104 of device 102 shows a second configuration 108 shown when device 102 is in text-entry mode. A portion of dynamic display 104 shows a keyboard 110 that generally conforms to a conventional QWERTY keyboard which can be used to enter alphanumeric text into the device. Keyboard 110 includes many of the keys found on full size keyboards, including a SHIFT key, a CAPS LOCK key, and may also include a CTRL (control) key. FIGS. 1A and 1B show one example of a dynamic display changing configurations or appearance to accommodate different functions. In this example, the entire area of dynamic display 104 is a touch screen (i.e., is a touch sensor) and the entire area may be used to display content. In other embodiments, only a portion of dynamic display 104 may have touch sensor capabilities while the other portions are not touch sensitive. An increasing number of modern cell phones, for example, have dynamic displays that show QWERTY keyboards when in text-entry mode.

Figure 2A:
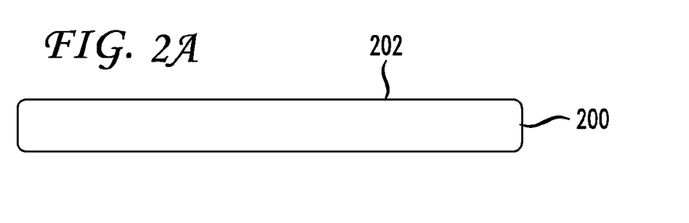
FIG. 2A is a cross-sectional side view of a device having a dynamic display.
Figure 2B:
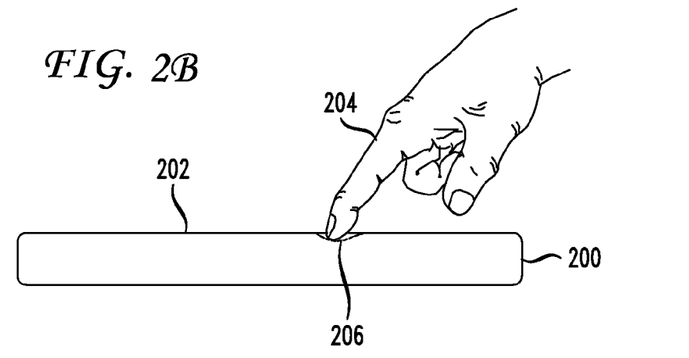
FIG. 2B is a cross-sectional side view of a device with a user hand pressing down on a display surface.

FIGS. 2A to 2D are a series of illustrations showing cross-sectional side views of a device and the perspective of a user using a text entry system in accordance with various embodiments. In FIG. 2A shows simply a cross-sectional side view of a device 200 having a dynamic display surface 202. As discussed below, device 200 has includes a text entry system (not shown) and a part of the width (or thickness) of device 200 is comprised of the text entry system layers of the present invention. FIG. 2B shows user's hand 204 (specifically, a user finger) pressing down on display surface 202 of device 200. By pressing down on surface 202, user finger 204 creates a depression 206 in surface 202. As is known in the field of touch screens and text entry systems, the act of "pressing down" on a surface includes, first, touching or coming in contact with the surface and, in the same continuous motion or action, applying greater pressure, thereby causing depression 206 in surface 202. Touching implies simply coming into contact with surface 202 and not applying the added pressure needed to cause depression 206. One variation of these two types of interaction (i.e., touching and pressing down) with a text entry system may be initially touching surface 202, pausing so that the system can register the touch action, then pressing down on the same key, at which time the system can register this second user action.

Figure 2C:
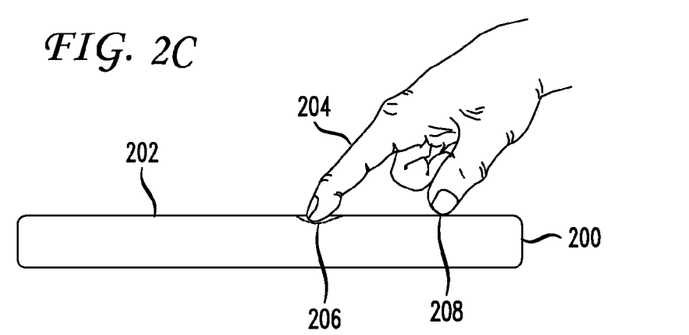
FIG. 2C is a cross-sectional side view of a device with a user finger depressing a key causing a depression in the surface and another finger simultaneously touching the surface.
Figure 2D:
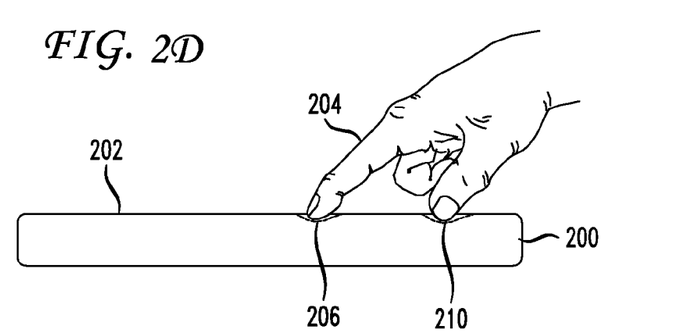
FIG. 2D is a cross-sectional side view of a device with a user finger depressing two keys at two locations on the surface.

FIG. 2C shows user finger 204 depressing a key as shown in FIG. 2B, causing depression 206 in surface 202, and simultaneously touching surface 202 at point 208. Although not evident from the figure, the user is pressing down and touching specific keys on a QWERTY-conforming keyboard displayed on device 200. Scenarios in which a user may want to press down on one key and touch another are described below. Depression 206 in surface 202 mimics the feel of a key depressing when typing on a conventional or full size keyboard. As described below, various flexible layers in the text entry system of the present invention enable depression 206 to form when the user presses down on surface 202. FIG. 2D is similar to the scenario shown in FIG. 2C with the difference that the user is pressing down at two locations on surface 202 thereby causing a second depression 210. Thus, a user is able to press down and feel the depression in surface 202 at two (or more) locations on the device. It may be noted that each depression made in surface 202 may be accompanied by another form of feedback to the user, such as an audible click or some other audio signal, haptic feedback, such as a vibration in the device, or visual feedback, such as a light flashing on the key. To keep the illustrations clear for the purpose of showing the depression in surface 202 of a dynamic display, the actual layers of the text entry system are not shown in FIGS. 2A to 2D, other than surface 202, which is essentially one layer in the system. In one embodiment, surface 202 may be a touch sensor layer. In another embodiment, it may be display layer. These embodiments and others are described in FIGS. 3 and 4.

Figure 3:
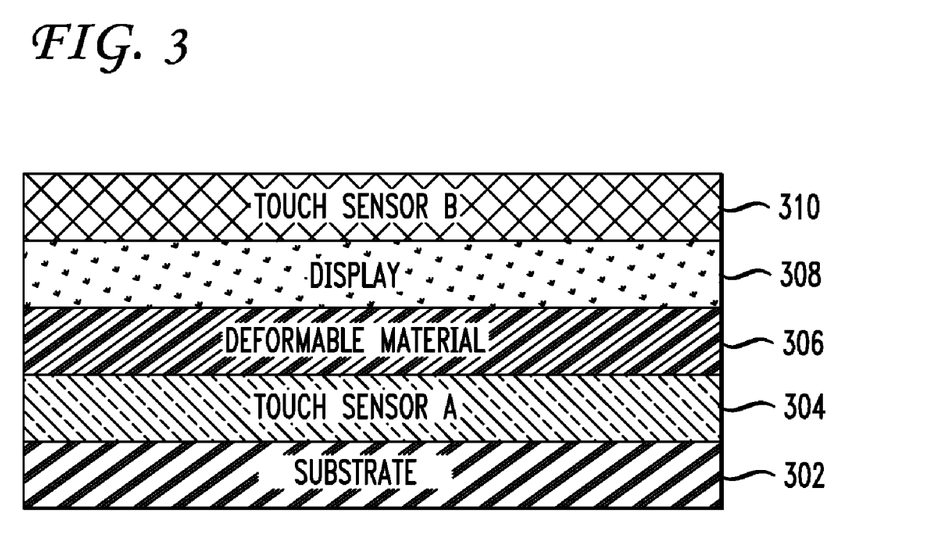
FIG. 3 is a block diagram of a sequence of materials and components of a text entry system in accordance with one embodiment of the present invention.

FIG. 3 is a block diagram of a sequence of materials and components of a text entry system in accordance with one embodiment of the present invention. As in the discussion above and for ease of explanation, each material or component in the text entry system may be described as a layer or a panel. A text entry (or text input) system 300 shown in FIG. 3 may be characterized as the display component of the mobile device. The first layer of component 300 is a substrate 302 which is typically rigid (i.e., non-flexible) and flat. As is known in the field of display technology, this material can be a metal, ceramic, glass, rigid plastic, or any other suitable material.

The layer immediately above substrate 302 is a touch sensor layer 304. In one embodiment, layer 304 uses resistive touch technology, which itself is comprised of various layers (or sub-layers), including electrically conductive (and resistive) metal layers. In one embodiment, touch sensor layer 304 is not flexible, that is, if pressed on, it will not compress or a depression will not form. For example, if pressure is applied to a particular spot on the layer, the pressure does not form a depression at that spot. In another embodiment, touch sensor layer 304 does not have multi-touch functionality. Multi-touch functionality is discussed in greater detail below. Above layer 304 is a deformable layer 306, also referred to as a cushion layer. Layer 306 compresses quickly at a specific spot when pressure is applied to that spot. It also decompresses or rebounds to its original shape (i.e., becomes level or flat) when the pressure is removed. In one embodiment, layer 306 is thin and may be made of soft foam, springs, air, or any other suitable material. Cushion layer 306 provides a cushion or flexible material (in the sense that it can be compressed) and is able to provide weight support for fingers or an entire hand.

It should not be so soft that the natural weight of a user's fingers when resting on the keyboard causes compression of cushion layer 306 (i.e., sink into the keyboard). Layer 306 does not have any touch sensor capabilities or display functionality.

In one embodiment, above layer 306 is a display layer 308 which displays images, text, or other content. In one embodiment, layer 308 is flexible. It can be depressed at a specific spot when pressure is applied to that spot. It may be made using an emissive technology, such as organic LED, or a reflective technology, such as "e-paper" material. In a preferred embodiment, display layer 308 is made from self-aligned imprint lithography (SAIL) on a polyethylene terephthalate (PET) thin-film substrate or other plastic substrate. The top layer shown in FIG. 3 is a second touch sensor layer 310. The properties of touch sensor layer 310 differ from those of first touch sensor layer 304. In one embodiment, layer or panel 310, which comes in actual contact with a user hand or other external object, is flexible. That is, pressure applied to a specific spot on layer 310 causes a depression in the layer at that spot. Flexible touch sensor technology includes capacitive touch sensors using transparent conductive films deposited on plastic or other flexible materials. The flexibility of the second (top) touch sensor layer 310, display layer 308, and cushion layer 306 collectively enable the text entry system of the present invention to mimic a conventional keyboard by allowing the user feel a depression on the surface when pressing on a key. This feeling of pressing down on a key may also be accompanied by other feedback, such as an audible click.

Figure 4:
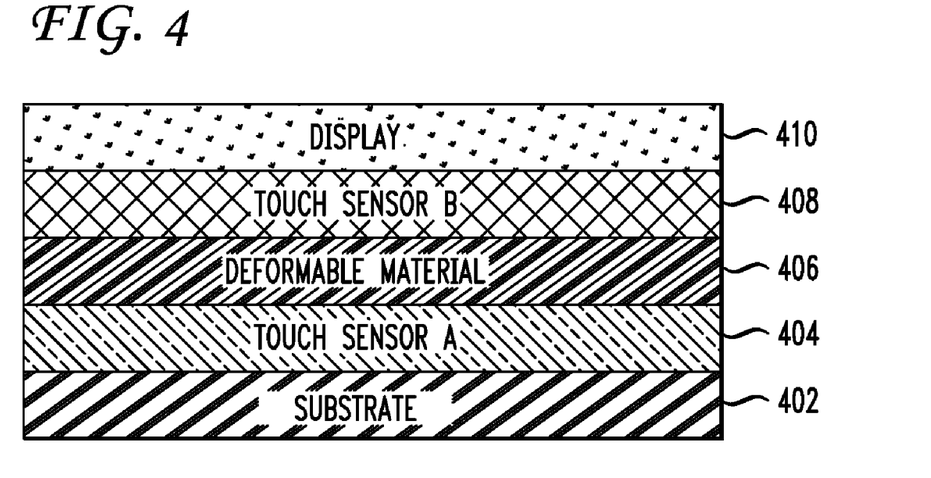
FIG. 4 is a similar block diagram of a sequence of materials and components of a text entry system in accordance with another embodiment of the present invention.

FIG. 4 is a similar block diagram of a sequence of materials and components of a text entry system in accordance with another embodiment of the present invention. The first three layers in a text entry system 400 are the same as those shown in FIG. 3. At the bottom of system 400 are a substrate layer 402, a first touch sensor layer 404, and a deformable or cushion layer 406. Each of these layers generally has the same properties as layers 302, 304, and 306 in FIG. 3. The layer above cushion layer 406 in FIG. 4 is a second touch sensor layer 408 instead of a display layer, as shown in FIG. 3. Touch sensor layer 408 is also flexible as is touch sensor layer 310. Above touch sensor layer 408 is display layer 410 which has the same properties as display layer 308.

The configurations of these five layers as shown in FIGS. 3 and 4 comprise two embodiments of the text entry system of the present invention. Other embodiments may include additional layers that do not detract from the flexibility of the keyboard (i.e., the ability of a key on the keyboard to be compressed when pressed down on). In other embodiments, the layers described above may have additional properties not specifically mentioned here. For example, the first touch sensor layer 304 or 404 does not have to be rigid; they may also be flexible, similar to upper touch sensor layers 308 and 408. As described below, other properties may vary as well.

As FIGS. 3 and 4 show, preferred embodiments of the text entry system of the present invention have two touch sensor layers separated by (although not necessarily adjacent to) a deformable layer, where the upper one of the touch sensor layers is adjacent to a display layer. In addition to the deformable layer, the adjacent touch sensor and display layers are flexible. In one embodiment, the touch sensor layers described above have single touch capability. In other embodiments, one or more of the touch sensor layers may have multi-touch functionality. As is known in the field of touch screen technology, a multi-touch sensor surface is able to process simultaneous contact of two or more points, e.g., fingers, on the surface and track their positions as they move.

In one embodiment, a multi-touch sensor layer is implemented using a capacitive touch sensor having a thin-film layer of indium tin oxide (ITO) on top of the display. In other embodiments, other suitable materials and technologies may be used to implement multi-touch capabilities.

In FIG. 3, touch sensor layer 310 may be a multi-touch sensor layer, as may layer 408 in FIG. 4. Similarly, touch sensor layers 304 and 404 may also have multi-touch functionality. In each embodiment, having one or both layers as multi-touch sensor layers enables certain keyboard functionalities. Depending on the style, positioning, and the type of device to which the keyboard is attached, it may not be necessary to track the position of all fingers resting on the keyboard. In some cases, such as with handheld devices, such as cell phones, a user may only rest the left and right thumb on the keyboard or may only have one thumb or finger on the keyboard at a time (the other thumb or fingers may be resting above the keyboard in a way that is natural or physically comfortable to the user).

In contrast, when a user uses a keyboard that is positioned horizontally and is somewhat larger than a keyboard on a small cell phone, multiple fingers may be resting on (having contact with) the keyboard, such as with a tablet style computer or a mini laptop. If upper touch screen sensor layers 310 or 408 are multi-touch sensors, then the user can simultaneously touch (i.e., not have to press down on) one key, e.g., the SHIFT key, and press down on another key. A user can do this to type a capital letter or type another key that requires shifting. It allows the user to utilize two (or more) keys concurrently, much as a user would typically do when using a conventional keyboard. In another embodiment, bottom touch sensor layers 304 or 404 are multi-touch sensors. In this case, the user simultaneously presses down on one key (as opposed to simply touching it) and presses down on the other key. Pressure needs to be applied to both the first key, such as the SHIFT key, and the second key because the touch sensor layer needs to be activated by having pressure applied to it from the cushion layer. In order for the cushion layer to be able to exert such pressure, the user needs to press down on the upper display layer or the touch sensor layer, depending on the specific embodiment. In this case the user can still use concurrent key strokes as she would with a conventional keyboard. The difference with the first case (with the upper layer being multi-touch) is the amount of pressure that needs to be applied to at least one of the keys being used, as both keys need to be depressed. These scenarios are shown in FIGS. 2C and 2D, respectively.

In FIG. 2C, the upper touch screen has multi-touch capability thereby allowing the user to touch one key and press down on the other. In FIG. 2D the lower touch screen has multi-touch capabilities so the user presses down on both keys so that the lower multi-touch screen is activated at two (or more) points by the cushion layer. If none of the touch sensor layers is multi-touch, the user types a sequence of key strokes (as opposed to concurrent key strokes) to achieve the same result. For example, the user presses or touches the CAPS Lock key, then the second key, and then the CAPS Lock key again sequentially to type a single capital letter. In another embodiment, the order of these two key presses could be reversed.

Figure 5:
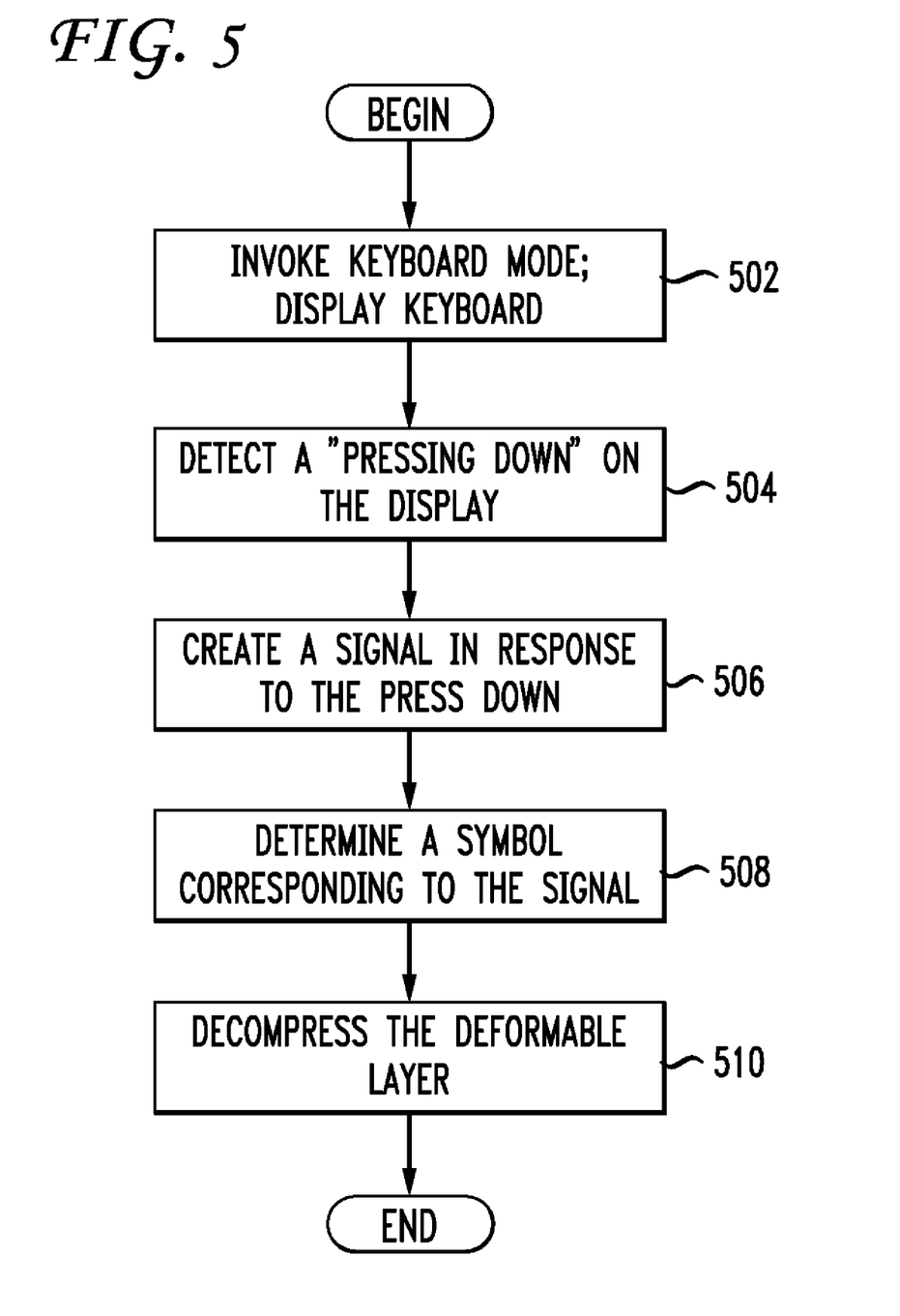
FIG. 5 is a flow diagram of a process of creating a signal from pressing down on a key in accordance with one embodiment.

FIG. 5 is a flow diagram of a process of creating a signal from pressing down on a key in accordance with one embodiment. A device may have various operational modes that affect the functionality of the layers comprising the text entry system described above. One of the modes may be referred to as a text input mode in which a text entry application on the device is active. The other modes may be referred to generally as non-text entry modes. In a text input mode, all the layers or panels of the text entry system described in FIGS. 3 and 4 are active. In a non-text input mode, only the display layer and the upper touch sensor layer may be active, thereby enabling the display of content on the device and allowing a user to use the touch screen for other non-keyboard data entry functions (e.g., touching icons, dragging/dropping, making selections, etc.). At step 502 the user performs an action that invokes the device's keyboard mode causing the display of a keyboard image. Text entry (or "keyboard") mode may be invoked in many ways, depending on the device. Typically, the user selects an option that requires entering text. For example, a user may tap on an icon for sending a text message, for entering contact information, or for entering a Web address. There are numerous similar uses or situations where the user needs to enter text. Once such an option is selected, the software on the device invokes keyboard mode and the content displayed changes dynamically to a keyboard. At this stage, certain text input and processing software in the device is executing and, as noted, the layers of the text entry system become active.

At step 504 the user presses one of the keys on the keyboard and feels a compression or depression and may also hear a click or similar sound. The operational software (that executes when in keyboard mode) detects this pressing down. As described in greater detail in FIG. 6, the compression of the top layer causes a compression in the layer below, which in turn causes a deformation in the cushion layer. This deformation in the cushion layer is detected by the lower touch sensor layer. At step 506 the software creates a signal in response to the detection by the lower touch sensor layer. This touch sensor layer may have been programmed to implement a coordinate system or grid in order to assign a coordinate (e.g., a geometrical (x,y) coordinate) to the exact location where the touch sensor layer detected contact from the cushion layer. The touch sensor layer may also have the means for recording a time at which contact was initially detected, such as its own internal clock or it may use the device clock. Thus, the signal created in response to the user pressing a key contains a coordinate value and a time value. This coordinate and time value of the key press may be described as the output of the lower touch sensor panel.

At step 508 the software determines which symbol corresponds to the signal created at step 506. This may be done by using the coordinate value of the signal as a means for identifying a symbol (e.g. a letter, number, punctuation mark, etc.) in some type of look-up table that associates or ties coordinate values with symbols. If a device can display different configurations (size, orientation, etc.) of a keyboard, there may be multiple such look-up tables. Techniques for determining a symbol in this context are known in the field of dynamic display technology. At step 510 the user releases the key or, essentially, stops pressing the key (which typically lasts less than a second) and the cushion layer begins decompression. In one embodiment, the material comprising the cushion layer is such that the original shape is restored quickly. That is, the cushion, which may be formed using air, foam, or springs, should not be too soft and should return to being flat very soon after the user releases pressure from the key. The display and touch screen layers above the cushion layer also return to their original shape once the user has lifted her finger from the key.

Figure 6:
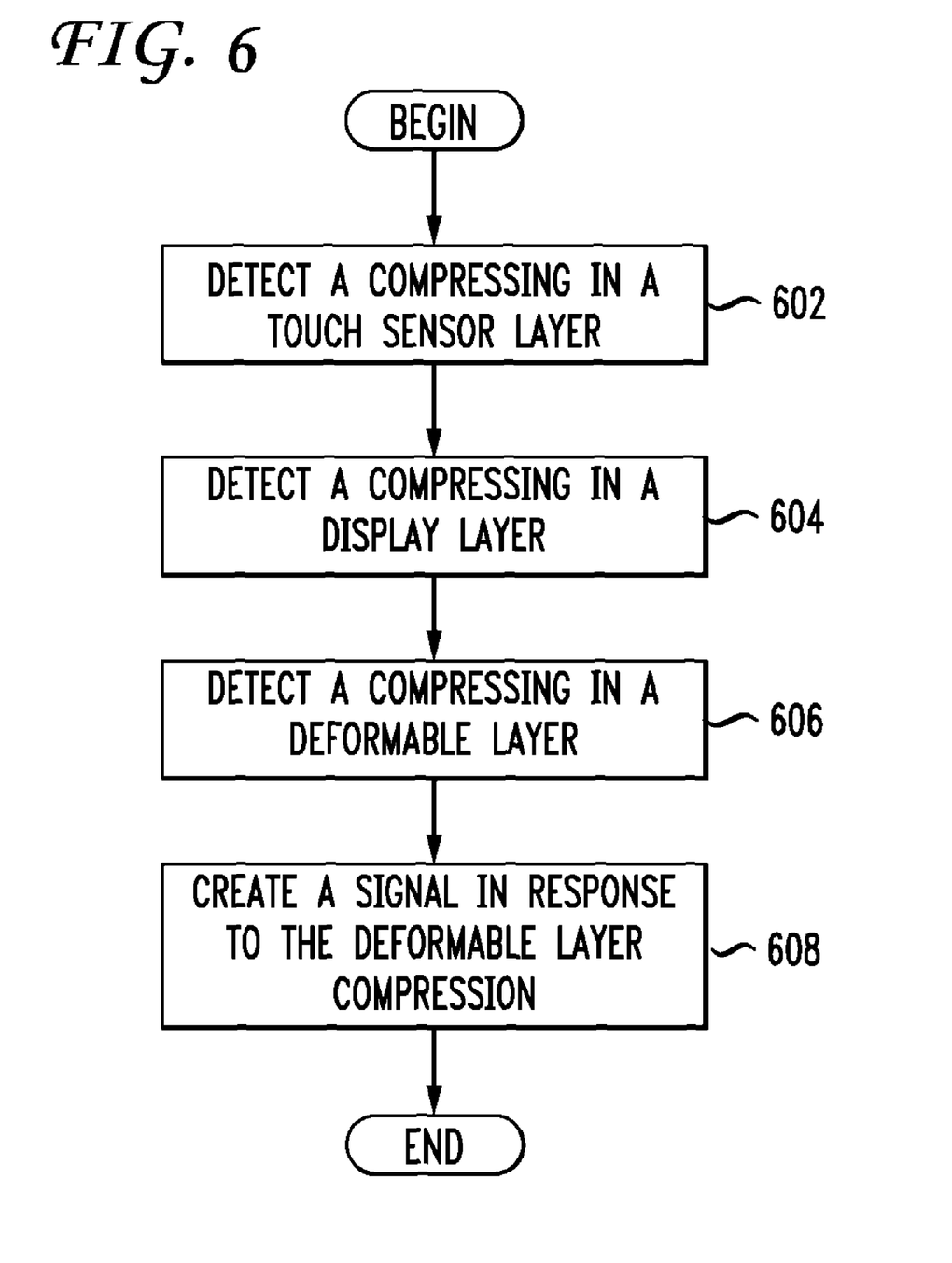
FIG. 6 is a flow diagram of a process of detecting a pressing down action on the display in accordance with one embodiment.

FIG. 6 is a flow diagram of a process of detecting a "press down" action on the display in accordance with one embodiment. It shows step 504 of FIG. 5 in greater detail. With the device already in keyboard or text-input mode, a user presses down on a key. In one embodiment, at step 602 a compression or depression is formed in a touch sensor layer (the top layer) of the display. In another embodiment, the display layer is the top layer and, thus, the depression is formed in the display layer. At step 604 a depression is formed in the display layer and is caused by the depression in the touch sensor layer. In another embodiment, a depression is formed in the touch sensor layer and is caused by the display layer.

At step 606 the deformable layer is compressed as a result of compression from the above two layers. As noted, the combination of these flexible layers or panels of the text entry system provides weight support and mechanical resistance for a user's fingers or hands, which will vary based on the type of device (e.g., handheld vs. laptop). For laptop-type devices or devices that have a horizontal keyboard, the user can rest her fingertips on the keyboard without triggering unwanted or false key presses. Step 608 is the same as step 506 of FIG. 5. A time/location signal is created by the lower touch sensor layer in response to the compression of the cushion layer above it. In a preferred embodiment, the cushion layer is adjacent to the lower touch sensor layer as shown in FIGS. 3 and 4. In other embodiments, the cushion layer is above the lower touch sensor layer but does not need to be adjacent.

Figure 7A:
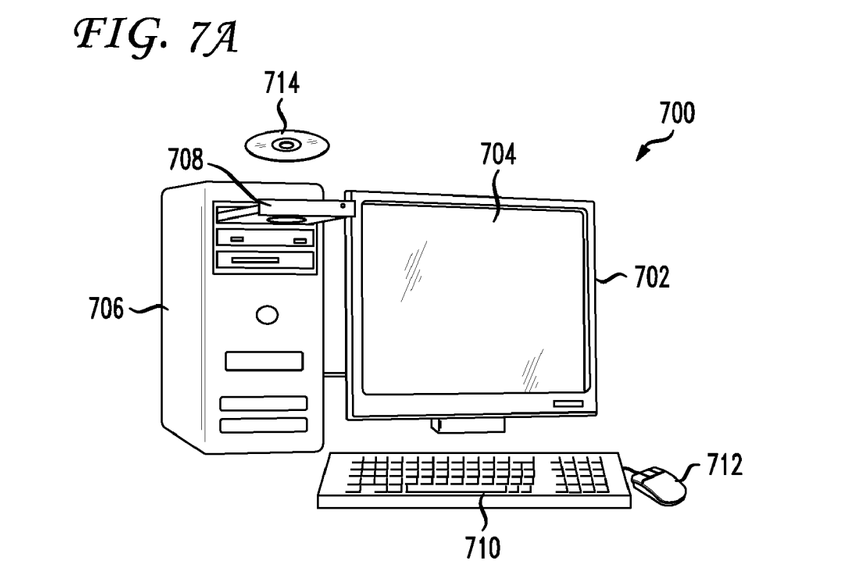
FIGS. 7A and 7B are illustrations of a computing system suitable for implementing embodiments of the present invention.
Figure 7B:
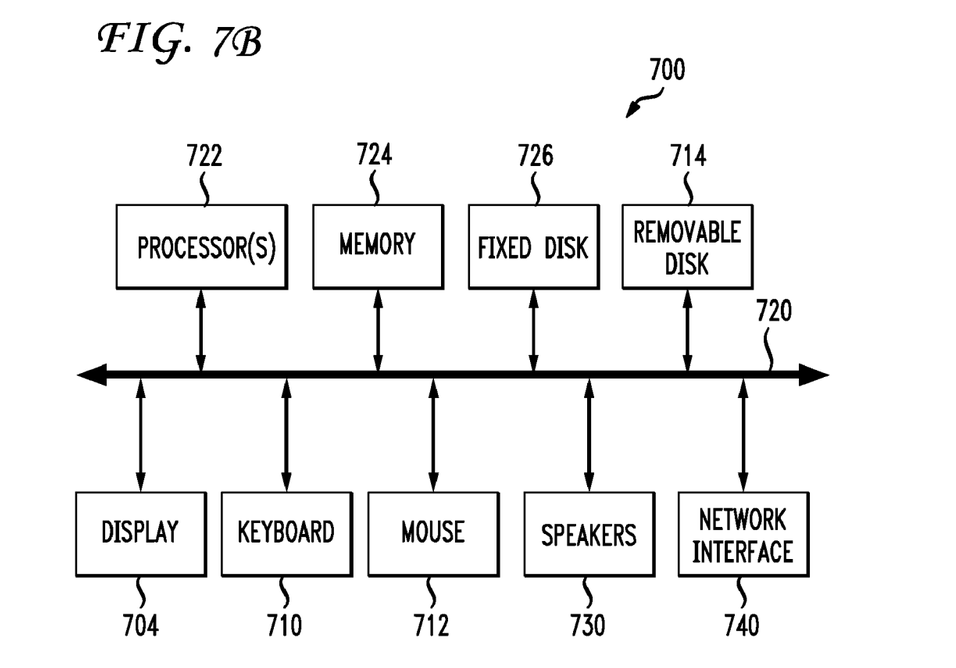

FIGS. 7A and 7B illustrate a computing system 700 suitable for implementing embodiments of the present invention. FIG. 7A shows one possible physical implementation of the computing system. Of course, the computing system may take on one of many physical forms including an integrated circuit, a printed circuit board, a digital camera, a small handheld device (such as a cell phone, smart handset, or media player), a personal computer or a server computer, a mobile computing device, an Internet appliance, a tablet-style computer, netbook computers, mini laptops, and the like. In one embodiment, computing system 700 includes a monitor 702, a display 704, a housing 706, a disk drive 708, a keyboard 710 and a mouse 712. Disk 714 is a computer-readable medium used to transfer data to and from computer system 700. Other computer-readable media may include USB memory devices and various types of memory chips, sticks, and cards.

FIG. 7B is an example of a block diagram for computing system 700. Attached to system bus 720 are a wide variety of subsystems. Processor(s) 722 (also referred to as central processing units, or CPUs) are coupled to storage devices including memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 726 is also coupled bi-directionally to CPU 722; it provides additional data storage capacity and may also include any of the computer-readable media described below. Fixed disk 726 may be used to store programs, data and the like and is typically a secondary storage medium (such as a hard disk) that is slower than primary storage. It will be appreciated that the information retained within fixed disk 726, may, in appropriate cases, be incorporated in standard fashion as virtual memory in memory 724. Removable disk 714 may take the form of any of the computer-readable media described below.

CPU 722 is also coupled to a variety of input/output devices such as display 704, keyboard 710, mouse 712 and speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 722 optionally may be coupled to another computer or telecommunications network using network interface 740. With such a network interface, it is contemplated that the CPU might receive information from the network, or might output information to the network in the course of performing the above-described method steps. Furthermore, method embodiments of the present invention may execute solely upon CPU 722 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A device comprising:
    a processor;
    a memory;
    a display component having
        a compressible touch sensitive layer;
        a compressible display layer adjacent to the compressible touch sensitive layer;
        a deformable layer for supporting a specific weight;
        a lower touch sensitive layer having a coordinate system;
    wherein a user applying pressure to the compressible display component at a specific spot creates a downward deformation at the specific spot, wherein the lower touch sensitive layer outputs a time value and a geometric coordinate value of the specific spot.

2. A device as recited in claim 1 further comprising:
    a substrate layer.

3. A device as recited in claim 1 wherein the compressible touch sensitive layer has multi-touch capabilities.

4. A device as recited in claim 1 wherein the lower touch sensitive layer has multi-touch capabilities.

5. A device recited in claim 1 wherein the deformable layer compresses when pressure greater than the specific weight is applied, thereby providing a resistance to a user's fingers and wherein the deformable layer does not compress when supporting the specific weight.

6. A device as recited in claim 1 wherein the compressible touch sensor layer is the top layer of the display component.

7. A device as recited in claim 1 wherein the compressible display layer is the top layer of the display component.

8. A device as recited in claim 1 wherein the deformable layer utilizes one of air, foam, and springs.

9. A display component comprising:
    a compressible touch sensitive layer;
    a compressible display layer adjacent to the compressible touch sensitive layer;
    a deformable layer for supporting a specific weight; and
    a lower touch sensitive layer for detecting deformations in the deformable layer;
    wherein a user applying pressure to the compressible display component at a specific spot creates a downward deformation at the specific spot, wherein the lower touch sensitive layer has a coordinate system and outputs a time value and a geometric coordinate value of the specific spot.

10. A device as recited in claim 9 further comprising:
    a substrate layer.

11. A device recited in claim 9 wherein the deformable layer compresses when pressure greater than the specific weight is applied, thereby providing a resistance to a user's fingers and wherein the deformable layer does not compress when supporting the specific weight.

12. A device as recited in claim 9 wherein the compressible touch sensor layer is the top layer of the display component.

13. A device as recited in claim 9 wherein the compressible display layer is the top layer of the display component.

* * * * *